July 2, 1957     J. J. McDERMOTT ET AL     2,797,704
CHECK VALVE
Filed Feb. 4, 1953
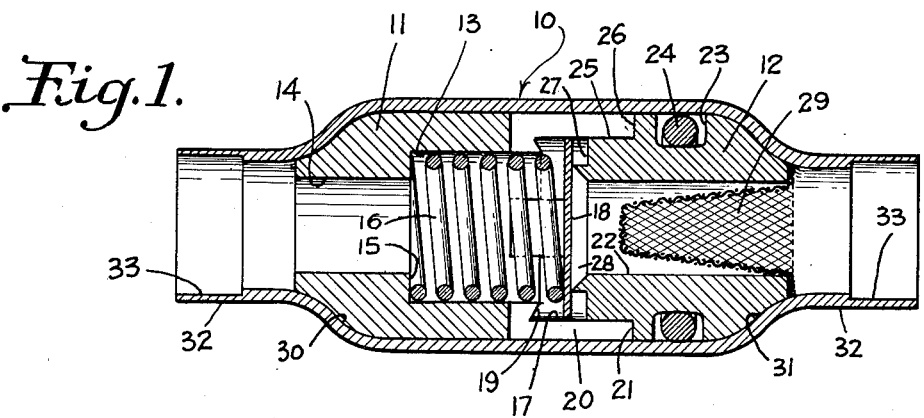
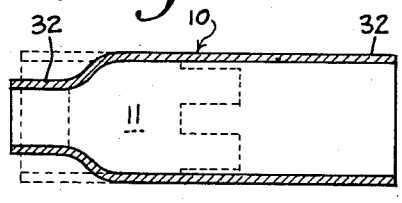
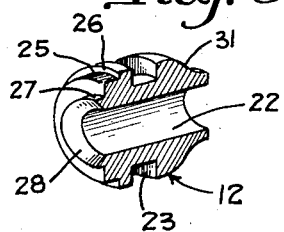
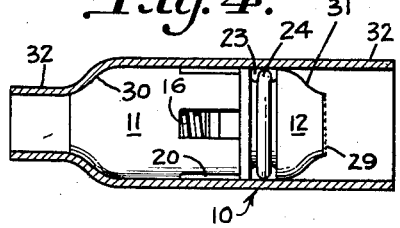
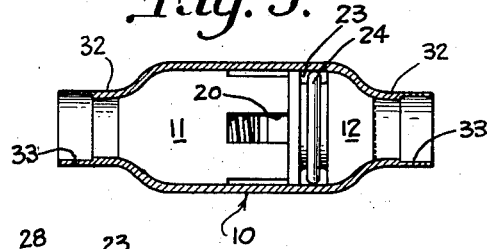
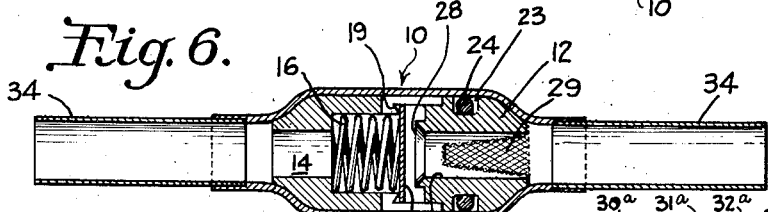
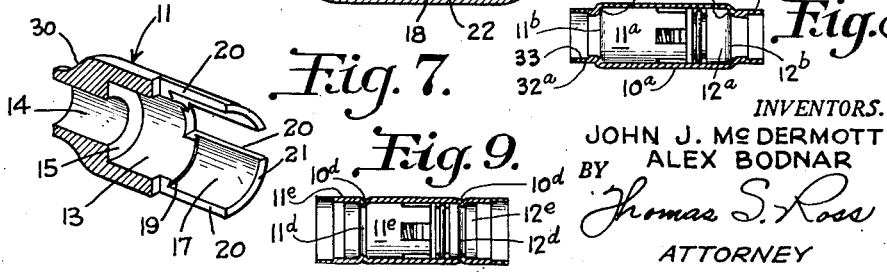
INVENTORS.
JOHN J. McDERMOTT
ALEX BODNAR
BY
Thomas S. Ross
ATTORNEY

United States Patent Office 2,797,704
Patented July 2, 1957

2,797,704

CHECK VALVE

John J. McDermott and Alex Bodnar, Bronx, N. Y.

Application February 4, 1953, Serial No. 335,108

8 Claims. (Cl. 137—543.19)

This invention relates to certain new and useful improvements in check valves of the type suitable for use in refrigerator systems for checking the reverse flow of both liquids and gases.

The invention provides a new check valve wherein the component parts of the valve are held in extremely accurate relation relative to one another by an imperforate casing section without the use of screw threads or other conventional fastening means; in which the valve, once assembled, cannot readily be taken apart without partial destruction thus making it substantially tamper proof; a valve in which highest standards can be maintained using mass production methods and at reduced costs; and a check valve that can be quickly, conveniently and economically installed in a flow line by a service man or others to dependably serve throughout its intended scope of utility.

Various other objects and advantages of the invention will be pointed out in the following description and claims, and illustrated in the accompanying drawings, which disclose, by way of example only, the principle of the invention and several modes, which may be employed, of applying that principle.

In the drawings:

Figure 1 is an enlarged longitudinal mid-sectional view of a check valve constructed according to the present invention.

Figure 2 is a longitudinal mid-sectional view of the imperforate valve casing after one end has been formed to embrace and conform with the complementary end of the valve guide body, the latter being illustrated by dotted lines.

Figure 3 is a longitudinal mid-sectional isometric detail view of the valve seat body.

Figure 4 is a sectional view of the imperforate valve casing as shown in Figure 2 with the internal parts of the valve installed therein and shown in side elevation.

Figure 5 is a view similar to Figure 4 illustrating the valve casing completely formed to rigidly lock the internal parts of the valve in assembled relation therein.

Figure 6 is a longitudinal mid-sectional view similar to Figure 1 but on a reduced scale and illustrating short sections of line tubing secured to the bored or stepped ends of the valve casing.

Figure 7 is a longitudinal mid-sectional isometric detail view of the valve guide body, and, Figures 8 and 9 are views partly in longitudinal cross-section and partly in elevation illustrating modified forms of a check valve embodying the present invention.

The component parts of the check valve chosen to illustrate the present invention will be described first in detail, and then the newly invented method of assembling such parts will be explained.

Referring to the drawings, and for the present to Figures 1 and 6, reference numeral 10 generally indicates an imperforate tubular valve casing which serves to lock the spring seat portion or valve guide body 11 in endwise cooperative relation with valve seat portion or valve seat body 12 in a manner and for reasons presently appearing. The spring seat portion or valve guide body 11 may comprise a cylindrical body member having an internal cylindrical spring barrel or chamber 13 and an axial bore forming a flow passage 14 of smaller diameter than the chamber 13, thereby providing a shoulder or seat 15 for one end of a valve compression spring 16. The inner or right hand end of valve guide body 11, as viewed in Figures 1 and 7, is suitably bored to provide a cylindrical valve guideway 17 for the valve 18. This latter bore is of larger diameter than the diameter of chamber 13 to provide an angular wall section 19 which forms a seat for the valve 18 when it is in open position as shown in Figure 6. As clearly illustrated in Figure 7 the valve guideway portion 17 of valve guide body 11 is provided with circumferentially spaced by-pass slots 20 thus forming spaced valve guide projections within which the valve 18 is slidably mounted. The slots 20 extend from terminal portions 21 of the valve guide projections to a point beyond the angular wall section or valve seat 19.

Referring now to Figure 3 the valve seat portion or valve seat body 12 preferably comprises a cylindrical body member having a flow passage 22 extending axially therethrough from end to end. An annular channel or groove 23 is formed in the periphery of body 12 to receive a resilient packing member 24 such as the O ring shown in Figures 1 and 4. Valve seat body 12 is circumferentially reduced at 25 to provide a shoulder 26 which cooperates with the terminal portions 21 of the spaced valve guide projections for reasons presently made clear. The inner end of valve guide body 12 is further circumferentially reduced at 27 to provide a tapered valve seat 28, which seat is disposed adjacent the inner end of flow passage 22. Valve 18 is normally held in closed position against the valve seat 28, of body 12, under tension of the compression spring 16 as best shown in Figure 1. A filter, such as the conical wire screen 29, may be suitably inserted within the flow passage 22 and held therein by frictional engagement with the casing 10 when the valve is fully assembled.

To assemble the form of check valve above described and illustrated in Figures 1 to 7 inclusive, the first step is to insert spring 16 into chamber 13 of valve guide body 11 until one end of the spring seats against the shoulder or seat 15 of said body. Valve 18 is then inserted into the valve guideway 17 and into contact with the other end of spring 16 thus compressing the spring between the valve 18 and seat 15. Valve seat body 12 is next assembled in end to end engagement with valve guide body 11 by insertion of the reduced annular surface 25 of body 12 into the bore forming the valve guideway 17 of body 11 until the terminal portions 21 of body 11 seat against the shoulder 26 of body 12. This endwise engagement of the bodies 11 and 12 accurately defines the distance between the valve seats 19 and 28 respectively. The resilient O ring may now be snapped into groove 23 in valve seat body 12 and the filter screen 29 inserted into the flow passageway 22 of the body 12.

With the internal parts of the check valve thus assembled they are then inserted endwise into the imperforate tubular valve casing 10 and the ends 32 of the casing are then deformed to closely embrace complementary curved locking portions 30 and 31 of bodies 11 and 12 respectively, to rigidly and permanently secure said valve bodies in locked end to end engagement relative to one another within casing 10, and without the use of threads or other conventional fastening means. If desired, the ends 32 of casing 10 may be bored out as indicated at 33 to receive short sections 34 of line tubing. These short sections of tubing may be secured to casing 10 in any conventional manner, as for example, by a soldering operation.

A modified form of the invention is illustrated in Figure 8 wherein the complementary locking portions 30a and 31a of valve guide body 11a and valve seat body 12a respectively are not reduced to the degree shown in the earlier described form illustrated in connection with Figures 1 to 7 inclusive. In this modified form of the invention the ends 32a of the imperforate valve casing 10a are formed over the locking portions 30a and 31a to closely embrace the outer end surfaces 11b and 12b of the bodies 11a and 12a respectively.

Still another modified form of the invention is illustrated in Figure 9 wherein the valve guide body 11e and valve seat body 12e respectively are provided with annular grooves 11d and 12d to receive annular ribs 10d formed in the casing 10e to rigidly lock the bodies in endwise engagement relative to one another within said casing.

From the foregoing detailed description of the improved check valve it will be understood that liquid or gases entering the valve through flow passage 22 in body 12 will force valve 18 from its seat 28 and move it against seat 19 thus compressing expansion spring 16. Flow of the gases or liquid is then from passage 22, past the valve 18 through by-pass slots 20, and then through flow passage 14 in body 11. It will also be clear that reverse flow of the gases or liquids through the valve is prevented by spring 16 acting to move valve 18 from seat 19, as shown in Figure 6, to closed position upon seat 28, as shown in Figure 1, in the conventional and well known manner.

While we have shown and described particular embodiments of our invention it will be apparent to those skilled in the art of check valves that numerous modifications and variations may be made in the form and construction thereof, without departing from the more fundamental principles of the invention. We therefore desire, by the following claims, to include within the scope of our invention all such similar and modified forms of the check valve disclosed, by which substantially the results of the invention may be obtained by substantially the same or equivalent means.

The invention claimed is:

1. A check valve comprising; a valve guide body; a valve seat body; a valve seat formed on the inner end of said valve seat body, said latter body being formed with a flow passage extending from end to end thereof; a plurality of spaced valve guide projections formed on the inner end of said valve guide body having terminal portions engaging a shoulder near the inner end of said valve seat body for accurately fixing the position of said bodies in endwise cooperative relation relative to one another; a valve slidable on said guide projections toward and from said seat; means housed in said valve guide body normally moving said valve into engagement with said seat; an imperforate tubular casing devoid of threads having peripheral engagement with said valve guide and valve seat bodies in endwise engaged relation; curved locking portions formed on the outer ends of said valve bodies respectively; and portions on the ends of said casing being deformed to engage said locking portions on said bodies to permanently retain said bodies in said endwise engaged relation within said casing, said casing cooperating wth said bodies to provide a closed flow passage between opposite ends of said bodies controlled by said valve.

2. A check valve comprising: a valve guide member formed with a flow passage opening through opposite ends; a valve seat member formed with a flow passage opening through opposite ends; a valve seat formed on the inner end of said valve seat member; a smooth peripheral positioning shoulder formed on said valve seat member; a valve member slidably mounted within the inner end of said valve guide member; a spring for normally holding said valve member in closed position against said valve seat; said valve guide member being formed to provide flow passages about said valve member when disengaged from said valve seat; and a tubular imperforate casing devoid of threads embracing said guide and seat members in peripheral contact therewith throughout the length thereof and having its end portions deformed to engage with the outer ends of said guide and seat members respectively to retain the inner end of said guide member rigidly engaged with said positioning shoulder for fixing said guide and seat members in endwise cooperative relation within said casing.

3. A check valve comprising: a valve seat member formed with a flow passage opening through opposite ends and formed with a valve seat on the inner end and a smooth peripheral positioning shoulder intermediate the ends; a valve member; a valve guide member formed with a flow passage opening through opposite ends, said guide member being formed at the inner end to slidably guide said valve member; said valve guide member being formed to support a valve spring for normally moving said valve member to engage said valve seat; said guide member having positioning elements on its inner end engaging said shoulder on the valve seat member for fixing the endwise position of said guide and seat members relative to one another; said guide member being formed to provide flow passages about said valve member when disengaged from said seat; a tubular imperforate casing embracing said guide and seat members in peripheral contact therewith throughout the length thereof; and opposite end portions of said casing projecting beyond said members having inwardly deformed sections engaging complementary portions of said guide and seat members and cooperating to retain said guide and seat members in permanently engaged and assembled relation within said casing.

4. A check valve comprising: a valve guide body formed with a flow passage and an internal valve guideway; a spring chamber formed in said valve guide body and disposed intermediate said passage and valve guideway; a tapered valve seat formed within said valve guide body intermediate said chamber and valve guideway; an annular shoulder formed in said valve guide body between said chamber and passage; a valve mounted for sliding movement within said guideway; a compression spring mounted within said chamber with one end engaging said shoulder and its other end engaging said valve; a valve seat body having a flow passage extending axially therethrough and formed with an annular groove in its outer periphery; a resilient packing ring fitting within and projecting from said groove; a filter screen mounted within the flow passage in said valve seat body; a tapered valve seat formed on said valve seat body adjacent the inner end thereof; and a threadless imperforate tubular valve casing having opposite ends deformed to engage complementary outer ends of said valve guide and valve seat bodies respectively to permanently retain said bodies in endwise cooperative engaged relation relative to one another and accurately space said valve seats within said casing.

5. In a check valve, the combination of: a valve guide body; a valve seat body; and a securing member having the intermediate portion lying adjacent the sides of said valve bodies and having end portions on opposite ends of said intermediate portion deformed to embrace complementary portions of said bodies for permanently retaining said bodies in assembled relation.

6. In a check valve, the combination of a valve guide body having a circumferential locking portion disposed adjacent the outer end thereof; a valve seat body having a circumferential locking portion disposed adjacent the outer end thereof; and an imperforate casing formed of sheet material of substantially uniform cross-section having end portions thereof deformed into contact with said locking portions of said bodies to thereby retain said bodies in end to end contact with one another within said casing.

7. In a check valve, the combiation of: a valve guide body having a circumferential locking portion adjacent its outer end; a valve seat body having a circumferential locking portion adjacent its outer end; and an imperforate tubular casing formed of sheet material of substantially uniform cross-section having portions thereof deformed inwardly to tightly embrace said locking portions to thereby permanently hold said bodies in end to end contact within said casing.

8. A check valve including a valve seat portion and a spring seat portion comprising the combination of a valve member; a valve spring aligned with and having one end engaging said spring seat portion and the other end engaging one side of said valve member for normally holding said valve member engaged with said valve seat portion; and an imperforate seamless tubular casing formed of sheet material of substantially uniform cross section enclosing said valve member and valve spring between said valve seat portion and said spring seat portion in substantially coaxial relation therein for movement of said valve member longitudinally between open and closed positions relative to said valve seat portion, said casing having a substantially uniform size larger than said valve member and valve spring throughout the portion of said casing enclosing said valve member and spring, said casing having inwardly extending annular portions beyond said valve member and spring at opposite ends thereof having flow openings therein and terminating in tubular ends of reduced size compared with said larger portion, said annular portions having a size smaller than said valve member and spring for cooperation with the connecting portions of said casing in enclosing and retaining said valve seat and spring seat portions in predetermined and accurately fixed relation for maintaining said spring under compression for normally retaining said valve member engaged with said valve seat portion, and said casing, valve seat and spring seat portions having a flow passage therein opening through said tubular ends at opposite ends of the casing.

References Cited in the file of this patent

UNITED STATES PATENTS

| | | |
|---|---|---|
| 344,202 | Robb | June 22, 1886 |
| 347,947 | Miles | Aug. 24, 1886 |
| 964,615 | Cordley | July 16, 1910 |
| 2,085,360 | Hammett | June 29, 1937 |
| 2,147,244 | Cornell | Feb. 14, 1939 |
| 2,202,211 | Kling | May 28, 1940 |
| 2,223,994 | Johnson | Dec. 3, 1940 |
| 2,357,657 | Jensen | Sept. 5, 1944 |
| 2,358,228 | Hoof | Sept. 12, 1944 |
| 2,481,713 | Bertea | Sept. 13, 1949 |

FOREIGN PATENTS

| | | |
|---|---|---|
| 489,602 | Great Britain | July 29, 1938 |